United States Patent [19]

Waldren

[11] Patent Number: 4,884,219

[45] Date of Patent: Nov. 28, 1989

[54] METHOD AND APPARATUS FOR THE PERCEPTION OF COMPUTER-GENERATED IMAGERY

[75] Inventor: Jonathan D. Waldren, Melton Mowbray, United Kingdom

[73] Assignee: W. Industries Limited, Leicester, United Kingdom

[21] Appl. No.: 144,090

[22] Filed: Jan. 15, 1988

[30] Foreign Application Priority Data

Jan. 21, 1987 [GB] United Kingdom ............... 8701288

[51] Int. Cl.$^4$ .................. G06F 15/62; G06F 15/20; G06K 15/00
[52] U.S. Cl. ................................. 364/514; 340/705; 340/980; 358/104; 364/516; 364/550; 434/43
[58] Field of Search ............... 364/514, 516, 550; 350/174; 340/705, 980, 825, 19; 358/93, 103, 104, 107; 434/38, 40, 43, 44; 351/210

[56] References Cited

U.S. PATENT DOCUMENTS

| | | | |
|---|---|---|---|
| 4,093,347 | 6/1978 | LaRussa | 350/174 |
| 4,246,605 | 1/1981 | LaRussa | 358/104 |
| 4,303,394 | 12/1981 | Berke et al. | 434/40 |
| 4,347,508 | 8/1982 | Spooner | 358/104 |
| 4,439,157 | 3/1984 | Breglia et al. | 350/174 |
| 4,439,755 | 3/1984 | LaRussa | 340/980 |
| 4,634,384 | 1/1987 | Neves et al. | 358/104 |
| 4,702,575 | 10/1987 | Breglia | 351/210 |

FOREIGN PATENT DOCUMENTS 1540992 2/1979 United Kingdom .
1578136 11/1980 United Kingdom .
2146877 4/1985 United Kingdom .

OTHER PUBLICATIONS

"Studying depth cues in a three-dimensional computer graphics workstation", *Machine Studies*, vol. 24, By J. D. Waldern et al., 1986, pp. 645-657.
"Eyemark Recorder Model V" brochure.

*Primary Examiner*—Parshotam S. Lall
*Assistant Examiner*—Kevin J. Teska
*Attorney, Agent, or Firm*—Young & Thompson

[57] ABSTRACT

The invention relates to a 3-dimensional computer graphics system in which an operator can effectively interact with a virtual model generated and displayed by a computer. In one embodiment the operator wears a helmet fitted with means which enable both the location of his head and its coordinates relative to the virtual model to be monitored and the information sent to computer. The helmet carries miniature VDUs which direct separate images to his individual eyes so that the image is perceived stereoscopically. The movement of the operator's eyes is also monitored by means mounted within housings of the helmet and data representing the operator's direction of vision sent to the computer. The data transmitted to the computer is used to modify the image of the model as perceived by the operator to enhance its realism.

8 Claims, 4 Drawing Sheets (a) HEADING  (b) PITCH  (c) BANK

METHOD AND APPARATUS FOR THE PERCEPTION OF COMPUTER-GENERATED IMAGERY

FIELD OF THE INVENTION

This invention relates to an improved method and apparatus for the perception of computer-generated imagery, particularly but not essentially three dimensional imagery.

BACKGROUND OF THE INVENTION

For some time now the sophistication of computer graphics together with high-resolution monitors or visual display units (VDUs) has permitted engineers and designers to create and manipulate computer-generated virtual models instead of using conventional drawing board techniques. By a "virtual model" is meant data which results in an image corresponding to an object having apparent spatial coordinates relative to the viewer. This image is referred to as a "virtual image".

Since the early 1970's, with the evolution of computer-aided design (CAD) the promise of true three-dimensional(3-D) computer model representation has then the key to advanced manufacturing technology. The enhanced "realism" of virtual image also has considerable application in the entertainment industry. Computer games and arcade machines have greater customer appeal with improved graphic displays, and there is considerable competition in this field to bring in new "generations" of such machines.

The principal limitation of all conventional computer graphic displays is that virtual models are shown as flat images on a visual display unit (VDU) or television screen. "Visual depth cues" in the flat image may aid in perceiving it as three-dimensional. In computer graphics a variety of cues such as kinetic and static interposition, perspective projection and hidden line removal are commonly used, but the 3-D image is always perceived as a flat view (e.g. as in photograph) having no spatial realism. Consequently users of CAD equipment such as engineering designers, still restort to traditional techniques based on the drawing board, such as plan views and side elevations, as an aid to alignment of their 3-D descriptions.

As an improvement upon such displays it has been proposed to move a visual diaplay unit (VDU) within the area in which a computer-generated, virtual model has a mapped coordinate position. The computer is programmed to transmit to the movable VDU an image of the model as seen from the current position of the VDU. To achieve this the current position of the VDU was detected by the triangulation of sonar pulses. Taking a fixed point 40 cm in front of the VDC screen as the position of the viewer's focus, his current line of sight was transmitted to the computer according to the user's spatial position and the orientation of the VDU. In this way the user could move around the location in space given to a computer-generated virtual model and "see" it from all angles on the VDU that he steers in front of him.

Furthermore the image perceived was stereoscopic. The user wore a helmet with a rotating shutter stereo decoding device. Two images were calculated from positions corresponding to the separation of the user's eyes and transmitted to the VDU by the computer.

One drawback of this system is the need for the user to move around with him, e.g. on a trolley, the VDU he is looking at. Another is that the screen image does not wholly fill the user's field of view that he can be distracted by real surroundings. More importantly, however, a stereoscopic image on a flat screen seen through a decoder does not achieve as realistic a three-dimensional effect as when a different image is received by each eye (as in real life).

OBJECTS OF THE INVENTION

The present invention takes advantages of a known system for monitoring movements of an eye and providing signals corresponding to the eye's movements. In accordance with the invention these signals, representing the direction in which the eye is looking as horizontal and vertical coordinates, are part of the data processed by the computer which is generating the images of the virtual model. Additional control data transmitted to the computer relates to the current position of the head of the user, both relative to his own body (as the head is turned) and in space as the user actually or apparently moves about. Again, head-mounted apparatus which will signal the current orientation of the head is known per se.

A recent technological advance which has been made the present invention feasible is the development of high-resolution, miniature VDUs. By mounting two of these on a helmet and arranging that each is viewed via a respective mirror/lens assembly in front of each eye the user is visually isolated from his "real" surroundings and his whole perception is made up of the two VDU images. These two images can be made to differ in accordance with the separation of the user's eyes to achieve realistic stereoscopic vision.

SUMMARY OF THE INVENTION

According to the invention there is provided three dimensional display apparatus comprising computer means for generating and displaying an image of a virtual model having spatial coordinates, and means for enabling a user to interact with the model by supplying to the computer means data relating to movement of the user's eyes, the computer means modifying the image displayed in accordance with said data.

Preferably means is provided for modifying the displayed image in accordance variations of the orientation of the user'head.

Preferably the said spatial coordinates are at least partly coincident with a known real 3-dimensional space in which said user is located, and the apparatus includes means for modifying the image displayed to the user in accordance with the position of the user within said space.

Preferably means is provided whereby the computer-generated image substantially fills the field of vision of the user. This can be achieved by the apparatus including a pair of miniature VDUs, each arranged to project an image into an individual eye of the user.

Preferably the computer means is operative to generate and present different images of the said model to the respective eyes of the user in accordance with monitored variations in the relative orientation of the user's two eyes, such that the virtual model is perceived stereoscopically, the image generating apparatus being controlled in accordance with the user's eye separation and the calculated, perceived distance of the user from the virtual model to reproduce the artificial binocular separation. The use of dual eye position monitoring apparatus enables the relative spatial "point of concentration" to be determined and the accurate calculation of the two images presented in the user's eyes.

The means for monitoring the position and orientation of the user's head may comprise an array of coils mountable on the user's head and energisable by an electric field, and means may be provided for decoding signals generated by said coils to define the location and orientation of the coils.

Head-mounted apparatus used in carrying out the invention preferably comprises a helmet device which comprises a pair of miniature, high resolution visual display units which present respective, computer-generated images to respective mirrors in front of the user's eyes, eye tracking means to detect movements of the user's eyeballs and means for monitoring the angular orientation of the user's head. Control signals from the eye tracking and head-position monitoring means are transmitted to the image generator, which calculates the respective images to be transmitted to the visual display units in accordance with this data together with data relating to the apparent spatial relation of the user to the visual model.

References to the user's position in space in the foregoing may mean either his actual, physical one or a hypothetical one which the computer has been instructed by the user to "believe in" through the use of suitable controls. Wearing the apparatus of the invention the user will be "blind" to the real world, but there may be included in the images he perceives a control medium (e.g. a "poster" displaying a "menu" of options) which he can operate, e.g. by means of a manual control or sensors attached to the body, thereby signalling to the computer a notional change in the user's position in space, so that the perceived images are calculated as from a standpoint different from the user's actual one. Similarly, of course, the virtual model or models generated by the computer are not necessarily "static", i.e. the spatial coordinates of a virtual model can be recalculated in real time so that it is perceived to move relative to the user. In these ways the perceived images can be "scrolled" in any direction and to any extent (as in the case of conventional, flat-screen imagery). The area within which the user can "move" is not limited and physical movement is unnecessary so that the user can, e.g., remain seated in a chair while viewing a computer generated virtual model from all possible angle and from any distance around, above or below it.

The degree of "realism" achieved by the system of the invention by comparison with viewing an image on a screen will be self-evident. The user will have the experience of entering a computer-generated environment and will be able to move in it (actually or apparantly) and interact with it. Improved useage of computer-generated models in industry is envisaged, but the greatest impact of the invention may be in revolutionising the entertainment industry. More than one user may occupy the same space (actual or virtual) and users may interact with one-another as well as with the computer-generated environment, which may include virtual models having apparent volition of their own. If the user also wears headphones transmitting a synchronised sound track he will realistically experience inhabiting an entirely artificial world. DR

BRIEF DESCRIPTION OF THE DRAWINGS

An embodiment of the invention will now be described, by way of example only, with reference to the accompanying diagrammatic drawings, in which.

DESCRIPTION OF THE PREFERRED EMBODIMENT

Figure 1:
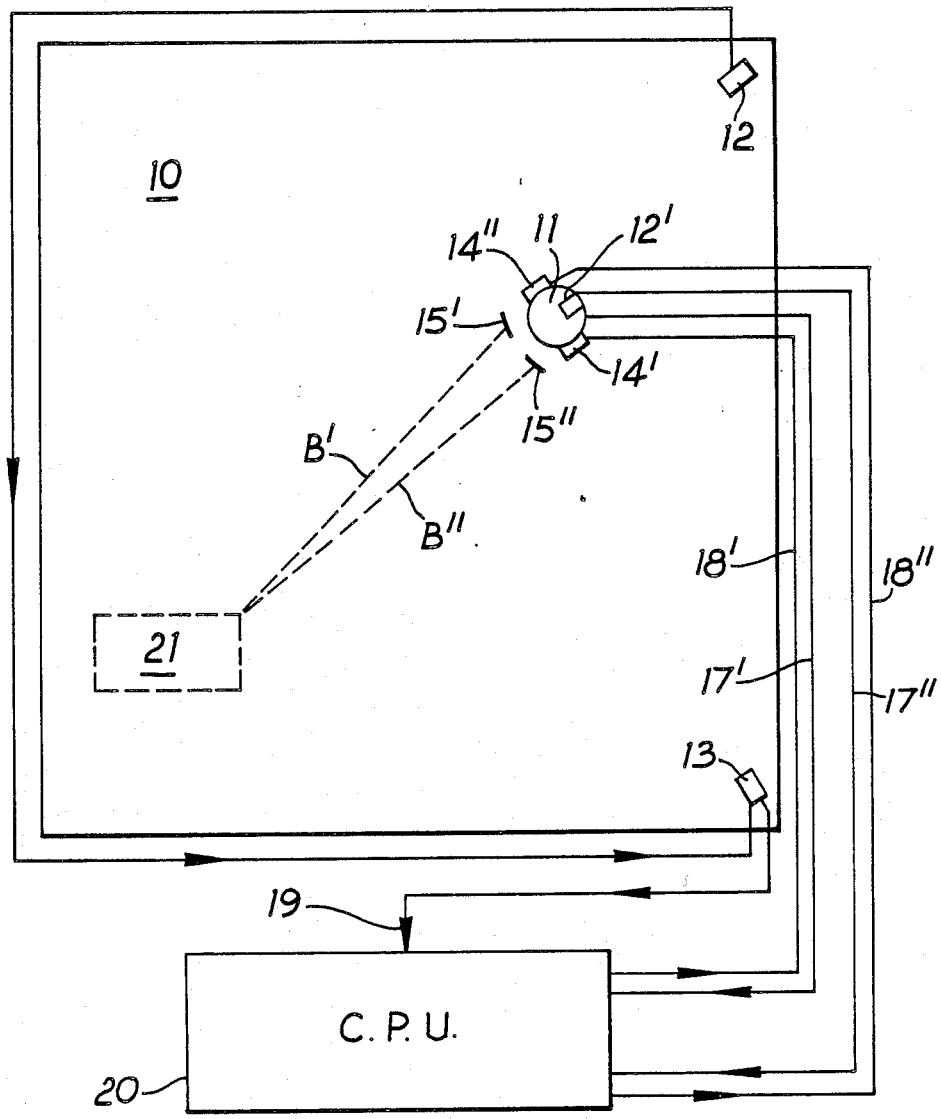
FIG. 1 is a lay-out sketch of apparatus in accordance with the invention.

Referring first to FIG. 1, in an enclosure 10 the current position of a person wearing a helmet 11 is continuously monitored. This may be done by optical scanning, remote monitoring equipment available from Movement Techniques Limited of the Technology Centre, Loughborough, England, under the trade name "CODA-3", or underfloor or infra-red sensor means. However a preferred device for monitoring the position of the helmet 10 comprises a pair of encapsulated modules 12 and 12'. Each module consists of three small coils mounted within the capsule so as to form an orthogonal triad. The module 12 acts as a fixed source or transmitter and is energised by a suitable power source to generate a low frequency electric field. The other module 12' is mounted on helmet 11 and acts as a movable sensor which samples the field so generated. The sensor and the transmitter are both connected to an electronics decode circuit 13 which decodes a signal from the sensor and computes the sensor's position and orientation in angular coordinates. The device thus provides data as to both the position and orientation of the helmet 11. This information is passed via line 19 to a computer 20. A position-monitoring device of this kind is manufactured and sold by Polhemus Navigation Sciences, a division of McDonnel Douglas Electronics Company under the name 3SPACE (TM) ISOTRAK. However other means may be used to provide a signal indicative of the user's current position in the enclosure 10. Such means can include the generation of sonar pulses and triangulation of the returned echoes. The computer 20 generates signals transmitted to the helmet 11 via lines 18' and 18" and these are converted into two images on respective high-resolution, miniature VDU's 14' and 14", such as those available from Brandenburg Limited of Thornton Heath, Surrey, England under the trade name "MINISCAN CRT". These are mounted on opposite sides of the helmet 11 to face forward so that the images are reflected by respective mirror lenses 15' and 15" into the respective eyes 16' and 16" of the wearer of the helmet 11, (see FIG. 2), the mirror lenses having fixed positions in front of the helmet.

Additionally there are built into the helmet 11 two eyeball movement tracking systems, or eye sensors which monitor movements of the wearer's eyeballs and transmit signals representing these movements to the computer 20 via lines 17' and 17". Suitable equipment is available from NAC and is known as the Eye Mark Recorder, Model V (EMR-V). By combining the data received via lines 17, 17' and 19 the computer 20 determines the current field of view of the wearer of the helmet 11 and his line of sight (represented by the broken lines B', B" in FIG. 1).

The images transmitted to the VDUs 14', 14" by the computer via lines 18', 18" are of a virtual model 21 having predetermined spatial coordinates within the area 10. With each movement of the wearer of the helmet 11, with each movement of the helmet 11 relative to the wearer and with each variation of the direction in which the helmet wearer is looking data are transmitted to the computer 20 via lines 17, 17" and 19 whereby the two images received via lines 18', 18" are recalculated. If, according to this information, the virtual model 21 is outside the helmet wearer's field of view no image of the model 21 will be transmitted to the VDUs. If the model 21 is within the helmet wearer's field of view the two images will be calculated so as to present a steroscopic view of the virtual model corresponding with what would be seen if the virtual model were a real object from the helmet wearer's current standpoint.

Figure 2:
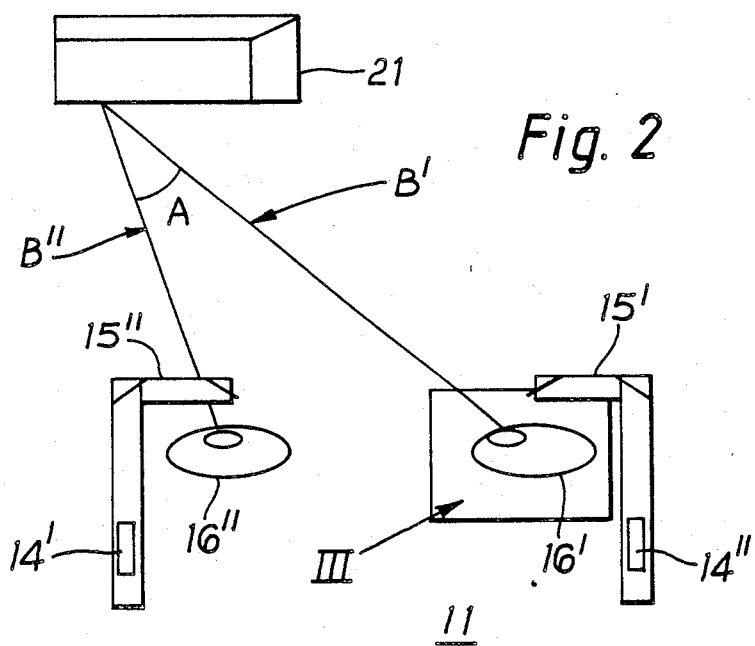
FIG. 2 is a view on a larger scale of components of the helmet shown in FIG. 1.
Figure 3:
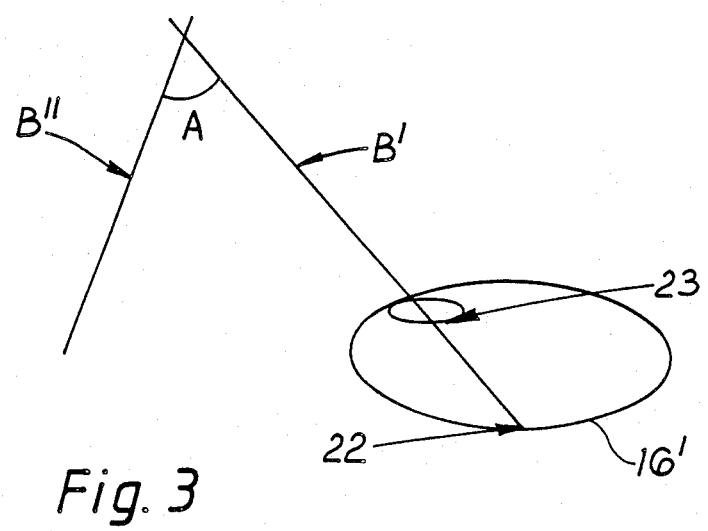
FIG. 3 is a view on a still larger scale of the area marked "III" in FIG. 2.

Referring now to FIGS. 2 and 3, the position of each eye 16', 16" with respect to the helmet 11 is output to the computer through lines 17', 17" as a cartesian coordinate by the respective eye monitoring assemblies (not shown), which may be charge couple devices. From this information the computer 20 can calculate the angle A subtended between the line of sight B', B" of two eyes where these intersect at the virtual model 21. This point of intersection represents a centre of concentration with respect to which the two images can be calculated, taking account of the wearer's interocular separation, which of course remains constant for any given wearer, so as to provide correct depth of focus and paralax separation of the images. Referring to FIG. 3, the position of the pupil 23 of the eye 16' is detected with reference to the centre 22 of the retina, and deviations from a line perpendicular to the retina a point 22 are output to the computer as x and y, horizontal and vertical coordinates.

The monitored information derived via lines 17', 17" and 19 is used to modify standard computer graphics algorithms of the computer 20. This preferably comprises a laser-disc based or other fast-access digital storage graphic imagery medium.

The helmet wearer may interact with the virtual model 21 by issuing suitable commands to the computer 20, e.g. by manipulative means or sensors attached e.g. to his fingers. The spatial coordinates of the virtual model can of course be changed to give the impression of movement relative to the helmet wearer.

Furthermore, and in a modification of the invention which is not illustrated, the signal via line 19 which instructs the computer 20 as to the helmet wearer's current spatial coordinates can be obtained not from his actual, physical position but from a coordinate position selected by means of a suitable control. In this way the wearer can be given the impression of moving about (perhaps vertically as well as horizontally) while remaining e.g. in a chair.

It will be appreciated that the physical area designated 10 in FIG. 1 has no subjective significance for the helmet wearer. Since his perception is wholly of a vertical environment created by the computer 20 there are no "physical" limits to variation of that environment, either by the apparent movement of the helmet wearer or the apparent movement of the virtual models he perceives.

It will also be appreciated that, e.g. for games applications of the apparatus of the invention, more than one helmet wearer may be receiving images from the same computer. In these circumstances helmet wearers may interact with one another instead of or as well as with virtual models generated by the computer.

Figure 4:
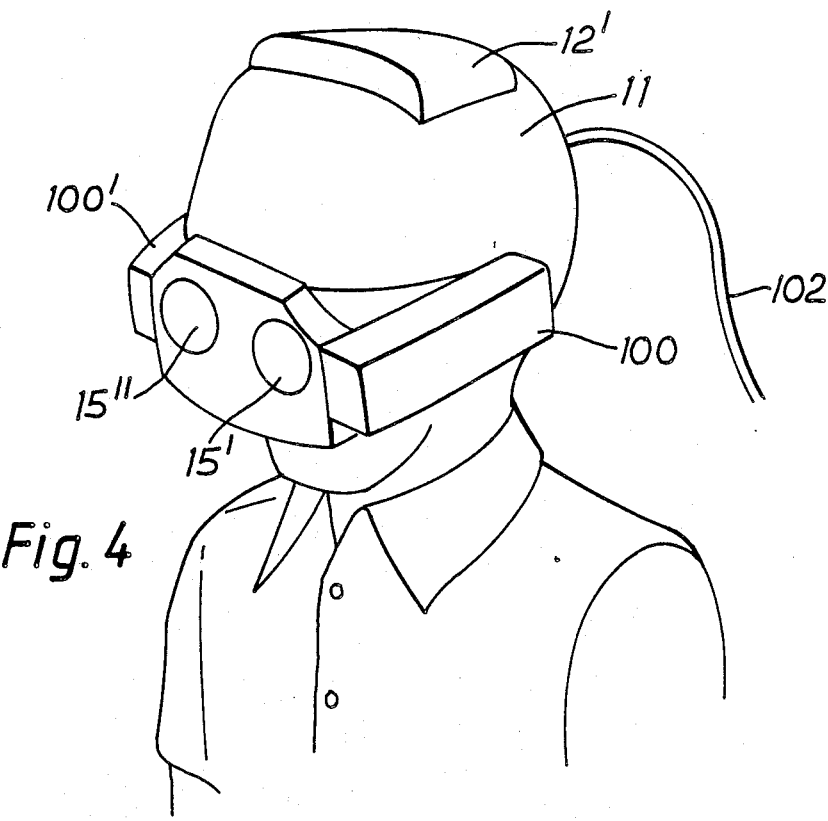
FIG. 4 is a perspective view of one embodiment of a helmet which can be used with the apparatus shown in FIG. 1, and FIGS. 5 and 6 are diagrams illustrating a 3-dimensional computing algorithm.

Referring now to FIG. 4 of the Drawings, this shows the helmet 11 in greater detail. The VDU's 14 and 14' are mounted within housings 100, 100'. These housings also carry an eye ball movement tracking sensor. Each sensor includes an LED light source which is directed into the eyeball being tracked by the sensor. A reflected image is passed to a coupled charge array and data regarding the eyeball's movement is output for subsequent use by computer 20. The lines 14, 14', 17 and 17' plus the requisite power supply are contained in an umbilical cord 102.

Several techniques are available for allowing a user to view a computer-generated model from any defined position. In the embodiment just described two different images are supplied to the user so that the perceived image is stereoscopic. However the basic algorithm for 3-dimensional perception applies to each of the images and it is this basic algorithm as applied to a single display screen which will now be described. With a perspective projection of an object the observer's line of sight is generally normal to the picture plane. The projectors of an object are the line linking the object to the observer's eye. The perspective projection consists of the intersections of the projectors and the picture plane. The distance between the observer and the picture plane controls the size of the perspective projection. Thus the further the picture plane is from the observer, the larger the projection. It will be appreciated that with the case of the miniature, helmet-mounted VDUs of the present embodiment which are very close to the observer the projection will necessarily be small.

In order to specify a unique view of an object in three dimensions it is necessary to calculate the observer's location and angular position of his line of sight. A notable feature of the system described as its ability to "open out" this 3D algorithm so that the observer can be effectively enclosed within the model. One way in which a model can be generated is by creating text files of coordinates comprising the vertices of the surface faces which are to form the model. With the observer at a known position relative to both the model and the centre of the 3-dimensional world which is to be occupied by the observer the angular orientation of the observer can be derived using simple trigonometry. The projection of the model is made by computing the perspective position of a point and subsequently drawing it on a screen.

Perspective view projected from the screen are located in the "centre of concentration" which becomes the centre of the screen. The centre of concentration can be defined as a point located at the screen's centre about which all stereo parallax calculations are made. The VDU screen thus becomes the picture plane with the distance of the user from the model replacing the distance between the picture plane and the model so that the screen effectively becomes the window used in a classical perspective algorithm.

Figure 5:
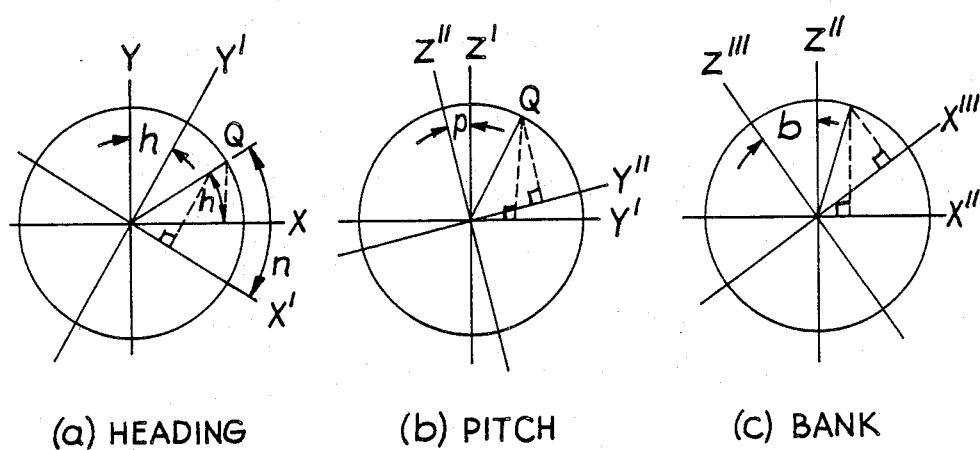

In calculating the perspective view of the model three rotations from a standard position are made. The algebra is greatly simplified by placing the observer at the origin with the line of sight aligned with the Y axis and this position will henceforth be referred to as the standard position. These three rotations, respectively Pitch, Bank and Heading, determine the line of sight. Of the three Bank is the least important although the following algorithm contains facilities to do so. However to eliminate the need to refer to the Bank rotation the X and Y axes are rotated about the Z axis by the amount of the Heading h so that one axis of the actual model will lie in the y'z' plane which is zero heading in the x'y'z' system. The y' and z' axes are then rotated about the x axis by the amount of the Pitch p so that the one axis of the model will lie on the y'' axis which is zero heading and zero pitch on the x''y''z'' system. Discounting the Bank rotation the model is now in the standard position in the x'''y'''z''' coordinate system, e.g. zero Heading, Pitch and Bank in the x'''y''' and z''' system. When each subsequent axis is rotated the coordinates that specify any point will correspondingly change. FIG. 5 of the Drawings illustrate the relationships between the original coordinate system and the three differently primed systems. For the heading any point $Q(X,Y,Z)$ the following relations hold:

$$
\begin{aligned}
X' &= R\cos(n) \\
&= R\cos(m + h) \\
&= R\cos(m)\cos(h) - R\sin(m)\sin(h) \\
&= X\cos(h) - Y\sin(h) \\
Y' &= R\sin(n) \\
&= R\sin(m + h) \\
&= R\sin(m)\cos(h) + R\cos(m)\sin(h) \\
&= Y\cos(h) + X\sin(h)
\end{aligned}
$$

and $$
\begin{aligned}
Z' &= Z \text{ for Pitch.} \\
X'' &= X' \\
Y'' &= Y'*\cos(p) + Z'*\sin(p) \\
Z'' &= Z'*\cos(p) - Y'*\sin(p)
\end{aligned}
$$

And if it were used for Bank:

$$X''' = X''*\cos(b) + Z''*\sin(b)$$

$$Y''' = Y''$$

$$Z''' = Z''*\cos(b) - X''*\sin(b)$$

By substituting these equations the rotation matrix becomes:

| $[\cos(b)*\cos(h) - \sin(b)*\sin(p)*\sin(h)]$ | $[-\cos(b)*\sin(h) - \sin(b)*\sin(p)*\cos(h)]$ | $[\sin(b)*\cos(b)]$ |
| $[\cos(p)*\sin(h)]$ | $[\cos(h)*\cos(p)]$ | $[0]$ |
| $[-\sin(b)*\cos(h) - \cos(b)*\sin(p)*\sin(h)]$ | $[\sin(b)*\sin(h) - \cos(b)*\sin(p)*\cos(h)]$ | $[\cos(b)*\cos(p)]$ |

Figure 6:
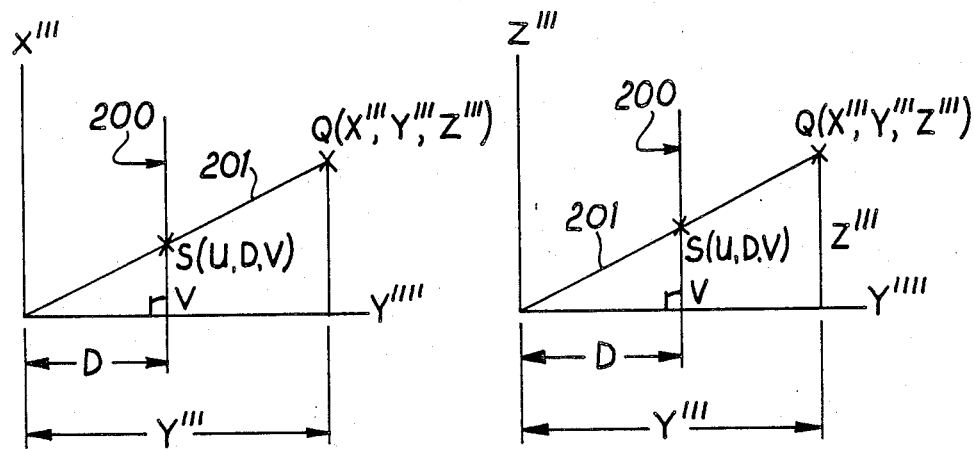

Once the observer is in the standard position it is relatively easy to compute the perspective of a point. The basic principle employed is shown in FIG. 6 of the Drawings. Here the perspective of a point Q is the intersection of a picture plane 200 and the projection line 201 joining the observer and the point. Since the observer is located at the origin the line of sight is the positive Y''' axis.

A new coordinate system is now defined for the picture plane. These coordinates are labelled u and v such that the u axis is parallel with the x''' axis and the v axis is parallel with the z''' axis. The relationship between the x'''y'''z''' coordinates of a 3D point P and the u-v coordinates of the point's projection in the picture plane is illustrated in FIG. 6. In this FIG. D is the distance between the observer and the picture plane. From similar triangles $$U = (DX''')/Y'''$$

$$V = (DZ''')/Y'''$$

When displaying this drawing on the screen the centre of concentration was calculated to be at the centre of the screen. As such the u and v axes are translated within the plane thus:

$$U = \text{mid}h + (ppu\ DX''')/Y'''$$

$$Y = \text{mid}v + (ppu\ DZ''')/Y'''$$

In these equations (midh, midv) is the screen's centre and ppu is a scaling factor of pixels per unit.

It will be appreciated that manipulation of the image of the model presented to a user of the system described with reference to FIGS. 1 to 4 of the Drawings in accordance with the location of the user, the direction in which he is looking and orientation of the user's head will enable the user to interact with the stereoscopically perceived model in an exceptionally realistic manner.

What is claimed is:

1. A 3-dimensional display system comprising:
    headwear having means mounted thereon to project individual images of a 3-dimensional object into respective eyes of a person wearing said headwear,
    means for monitoring variations of spatial coordinates relating to said wearer,
    means for monitoring variations of an orientation of said wearer's head,
    means for monitoring a line of sight of each said eye of said wearer and for monitoring variations of an angle of convergence of said lines of sight,
    computer means for generating two images of the three-dimensional object having spatial coordinates, and
    means for modifying said images in response to variations of a relationship between said spatial coordinates, said orientation and said angle of convergence,
    such that the image presented to each said eye is of said 3-dimensional object as seen by said eye at a distance from said wearer determined by said angle of convergence whereby said wearer perceives said object stereoscopically.

2. A display system as claimed in claim 1, wherein said means for monitoring said lines of sight comprises a pair of light sources and charge couple devices mounted on said headwear, said charge couple devices being responsive to reflections of said light source from said eyes to monitor movement thereof, means being provided to output signals of said charge couple devices as a cartesian coordinate to said computer means.

3. A display system as claimed in claim 1, wherein said computer means is a fast-access digital storage graphic imagery medium having standard computer graphic algorithms and wherein means is provided to modify said algorithms in response to signals generated by said orientation and line of sight monitoring means.

4. A display system as claimed in claim 1, wherein said means mounted on said helmet means to project individual images into respective eyes of a person wearing said headwear comprises a pair of high-resolution, miniature VDUs mounted on opposite sides of said headwear to face forwardly and a pair of mirror lenses having fixed positions in front of the headwear such as to reflect images on the respective VDUs into respective eyes of said wearer.

5. A display system as claimed in claim 1, wherein said means for monitoring spatial coordinates relating to said wearer and for monitoring variation of an orientation of said wearer's head comprises means having a fixed spatial position for generating a low frequency electrical field, sensor means mounted on said headwear for sampling the field so generated and electronic decode means for decoding a signal from said sensor, for computing a position and angular orientation of the sensor in angular coordinates and for transmitting said angular coordinates to said computer means.

6. A display system as claimed in claim 1, wherein said means for monitoring spatial coordinates relating to said wearer comprises means for the generation of sonar pulses and for triangulation of returned echoes of said pulses.

7. A display system as claimed in claim 1, wherein said means for monitoring spatial coordinates relating to said wearer comprises underfloor sensor means.

8. A display system as claimed in claim 1, wherein said means for monitoring spatial coordinates relating to said wearer comprises infra red sensor means.

* * * * *

UNITED STATES PATENT AND TRADEMARK OFFICE
CERTIFICATE OF CORRECTION

PATENT NO. : 4,884,219

DATED : November 28, 1989

INVENTOR(S) : Jonathan David WALDERN

It is certified that error appears in the above—identified patent and that said Letters Patent is hereby corrected as shown below:

On the title page, Item 19, change "Waldren" to --Waldern--.

On the title page, Item 75, change "Waldren" to --Waldern--.

Signed and Sealed this

Twenty-sixth Day of March, 1991

Attest:

HARRY F. MANBECK, JR.

Attesting Officer

Commissioner of Patents and Trademarks